(12) United States Patent
Wright

(10) Patent No.: US 8,519,884 B2
(45) Date of Patent: Aug. 27, 2013

(54) DISTANCE ESTIMATION

(75) Inventor: Joshua Wright, Riverside, RI (US)

(73) Assignee: Aruba Networks, Inc., Sunnyvale, CA (US)

(*) Notice: Subject to any disclaimer, the term of this patent is extended or adjusted under 35 U.S.C. 154(b) by 50 days.

(21) Appl. No.: 12/181,859

(22) Filed: Jul. 29, 2008

(65) Prior Publication Data
US 2010/0026558 A1 Feb. 4, 2010

(51) Int. Cl.
*G01S 13/08* (2006.01)
(52) U.S. Cl.
USPC ................................................ 342/125
(58) Field of Classification Search
USPC ................................................ 342/125
See application file for complete search history.

(56) References Cited

U.S. PATENT DOCUMENTS

| | | | | |
|---|---|---|---|---|
| 7,107,065 B2* | 9/2006 | Overy et al. | | 455/456.2 |
| 7,164,887 B2* | 1/2007 | Tanada et al. | | 455/41.2 |
| 7,254,421 B2* | 8/2007 | Archiable | | 455/574 |
| 7,272,404 B2* | 9/2007 | Overy et al. | | 455/456.1 |
| 7,317,903 B2* | 1/2008 | Omori et al. | | 455/127.3 |
| 7,430,434 B2* | 9/2008 | Choi et al. | | 455/522 |
| 7,430,435 B2* | 9/2008 | Choi et al. | | 455/522 |
| 7,567,794 B2* | 7/2009 | Dempsey | | 455/404.1 |
| 7,602,275 B2* | 10/2009 | Dishongh et al. | | 340/309.16 |
| 7,826,862 B2* | 11/2010 | Malik et al. | | 455/522 |
| 2004/0068744 A1* | 4/2004 | Claussen et al. | | 725/81 |
| 2004/0166889 A1* | 8/2004 | Backes et al. | | 455/522 |
| 2006/0262767 A1* | 11/2006 | Peleg et al. | | 370/338 |
| 2006/0267841 A1* | 11/2006 | Lee et al. | | 342/463 |
| 2007/0242621 A1* | 10/2007 | Nandagopalan et al. | | 370/254 |
| 2008/0311870 A1* | 12/2008 | Walley et al. | | 455/186.1 |
| 2009/0011713 A1* | 1/2009 | Abusubaih et al. | | 455/67.11 |
| 2009/0174546 A1* | 7/2009 | Lian et al. | | 340/539.1 |
| 2009/0287853 A1* | 11/2009 | Carson | | 710/16 |
| 2010/0164714 A1* | 7/2010 | Buller et al. | | 340/539.32 |
| 2010/0317390 A1* | 12/2010 | Rekimoto | | 455/511 |

OTHER PUBLICATIONS

Abusubaih et al. "A Dual Distance Measurement Scheme for Indoor IEEE 802.11 Wireless Local Area Networks." In Proc. of the $9^{th}$ IFIP/IEEE International Conference on Mobile and Wireless Communication Networks. Sep. 2007.*

Awad et al. "Adaptive Distance Estimation and Localization in WSN using RSSI Measures." 10th Euromicro Conference on Digital System Design Architectures, Methods, and Tools. Aug. 2007.*

"Bluetooth". mobileisgood.com article. <http://web.archive.org/web/20070524003905/http://www.mobileisgood.com/WhatIsBluetooth.php> May 24, 2007. Accessed Sep. 14, 2011.*

(Continued)

*Primary Examiner* — Matthew M Barker
(74) *Attorney, Agent, or Firm* — Blakely, Sokoloff, Taylor & Zafman LLP

(57) ABSTRACT

Improved distance estimation of a selected transmitter. An improved distance estimate from a target transmitter to a receiver is produced by assessing the target transmitter to determine transmit power, and combining this information with a propagation model, received signal strength, and reference signal strength indications. Target transmit power may be assessed through knowledge of the target device or device class, and/or transmit power reporting features of target wireless networks. The assessment may be made through looking up reported target device characteristics in a database, making inferences based on target device characteristics, or through standards-based diagnostic and/or reporting mechanisms.

19 Claims, 1 Drawing Sheet

(56) References Cited

OTHER PUBLICATIONS

"Assigned Numbers—Bluetooth Baseband". Bluetooth.org document. <http://netlab.cs.ucla.edu/wiki/files/class_of_device.pdf> Oct. 12, 2006. Accessed Feb. 15, 2012.*

Feldmann et al. "An Indoor Bluetooth-Based Positioning System: Concept, Implementation and Experimental Evaluation." Proceedings of the International Conference on Wireless Networks, ICWN '03. Jun. 23-26, 2003.*

Fernandez et al. "Bluetooth Sensor Network Positioning System with Dynamic Calibration." 4th International Symposium on Wireless Communication Systems, 2007. Oct. 17-19, 2007. pp. 45-49.*

Madhavapeddy et al. "A Study of Bluetooth Propagation Using Accurate Indoor Location Mapping." UbiComp'05 Proceedings of the 7th international conference on Ubiquitous Computing. Sep. 11-14, 2005. pp. 105-122.*

IEEE. "IEEE Standard for Information technology—Telecommunications and Information exchange between systems—Local and Metropolitan area networks—Specific Requirements." Part 11: Wireless LAN Medium Access Control (MAC) and Physical Layer (PHY) Specifications. Amendment 1: Radio Resource Measurement of Wireless LANs. IEEE Computer Society. IEEE Std 802.11k 2008.

Draft Standard for Information technology—Telecommunications and Information exchange between systems—Local and Metropolitan area networks—Specific Requirements. Part 11: Wireless LAN Medium Access Control (MAC) and Physical Layer (PHY) Specifications. Amendment 9: Wireless Network Management. IEEE P802.11V/D2.01, Apr. 2008.

Specification of the BlueTooth System Wireless Connections Made Easy, Master Table of Contents & Compliance Requirements, Specification vol. 0, Covered Core Package version: 2.1 + EDR, Current Master TOC issued Jul. 26, 2007.

* cited by examiner

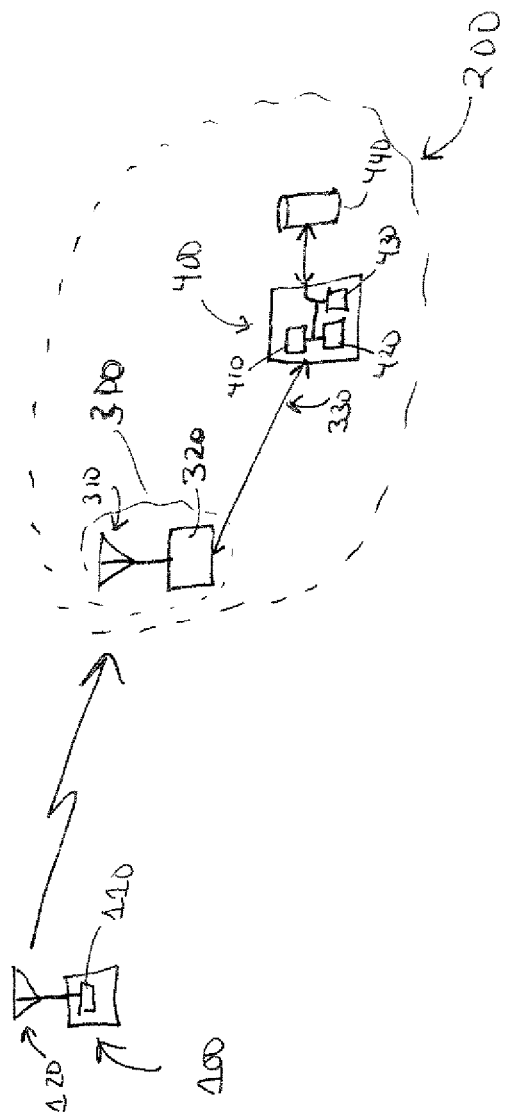

DISTANCE ESTIMATION

BACKGROUND OF THE INVENTION

The present invention relates to wireless systems, and in particular, to the problem of estimating the distance from a single receiver to a wireless transmitter.

Many applications make use of distance estimation for a target transmitter to some point. Many of these leverage the radio signal strength indicator (RSSI) defined in IEEE 802.11, or received channel power indicator (RCPI) signal defined in IEEE 802.11k, supplied by many devices, coupled with a reference source and a propagation model. Distance estimation is used in many fields, including security systems, asset tracking, RFID, and applications which are context and/or location aware.

The ability to identify a target transmitter's approximate distance from a single receiver is based upon several factors, often resulting in incorrect distance estimates which are skewed by unknown environmental and transmitter characteristics. Such inaccuracies reduce the effective use of this technique, as unknown factors can significantly skew distance measurement data, resulting in inconsistent and unreliable data.

One approach to estimating the distance of a target transmitter to a given receiver is based on the Free Space Path Loss (FSPL) propagation model, which gives expected path loss as a function of frequency and distance. Combining the FSPL model with a reference signal strength and a received signal strength from the target allows an estimate of the target distance to be computed. The reference signal strength, such as from RSSI or RCPI measurements, typically describes the expected signal observed by the receiver at a fixed distance of a known device (operating at known frequency and power levels). Unfortunately, this reference measurement may not represent the transmit power of the target, resulting in inaccuracies in distance estimates.

What is needed is an improved method of distance estimation for wireless devices.

BRIEF DESCRIPTION OF THE DRAWINGS

The invention may be best understood by referring to the following description and accompanying drawings that are used to illustrate embodiments of the invention in which:

FIG. 1 shows a target device and a measuring system.

DETAILED DESCRIPTION

Embodiments of the invention relate to improved methods of distance estimation for wireless devices. According to an embodiment of the invention, by assessing the target device, it is possible to determine the target device's transmit power level to a greater degree of accuracy than a constant reference RSSI measurement. Using this improved transmit power information, distance estimates are improved. Assessment of the target device may be made through knowledge of similar devices, looking up device characteristics, and/or by using transmit power reporting features of wireless networks.

FIG. 1. shows an embodiment of the invention including a target transmitter 100 and distance estimation subsystem 200. Target 100 contains transmitter 110 operating in a frequency band f, and antenna 120. As is known to the art, the strength of the signal produced by target 100, often estimated as effective radiated power (ERP) is a function of transmitter 110 power output and gain of antenna 120.

Distance estimating subsystem 200 comprises receiver subsystem 300 and distance estimating subsystem 400. Receiver subsystem 300 comprises antenna 310 and receiver 320, which sends a signal 330 representing received signal strength, such as RSSI, to distance estimating subsystem 400.

In one embodiment of the invention, receiver subsystem 300 may be implemented as a simple receiver producing an analog signal strength signal 330 provided to distance estimating subsystem 400.

In other embodiments, receiver subsystem 300 is a function of a surveillance node on a network, or a function of an access node on a network. As known to the art, surveillance nodes and/or access nodes are small purpose-built computer systems having one or more radio interfaces, a CPU, memory hierarchy, and input/output interfaces including network interfaces. Under control of a CPU such as MIPS-class CPU and an operating system such as Linux or other operating system for embedded devices such as VXWorks, the characteristics of the device are defined by the software it runs. Surveillance node functionality may be a component of access node operation. When operating according to the present invention, receiver subsystem 300 captures data including signal strength data and communicates this data, along with other identifying information, to distance estimating subsystem 400. This communication is typically done using wired or wireless Ethernet, other wireless services such as WiMAX, EDGE, or 3G services, or a combination.

Distance estimating subsystem 400 comprises CPU 410, memory hierarchy 420, and input/output subsystem 430. As is understood in the art, memory hierarchy 420 comprises persistent memory such as flash or read-only-memory for system startup, fast read-write memory such as DRAM for holding instructions and data during system operation, and persistent memory for file storage such as flash, compact flash (CF), or hard disks. Input/output subsystem 430 may include interfaces such as Ethernet, Fast Ethernet, 802.11 wireless, as well as local interfaces such as USB, serial, keyboard, and display interfaces as needed by the application. This overall functionality may be provided for example by a general-purpose computer, such as a Macintosh computer from Apple Inc, an Intel or AMD processor based system running a Linux or Windows variant, or an embedded system such as one using a MIPS-class processor under control of a Linux operating system.

One embodiment of the invention pertains to assessing the transmit power of Bluetooth devices. According to the Bluetooth specification, transmitters operate at one of three power levels: 1 mW (0 dBm), 2.5 mW (4 dBm), or 100 mW (20 dBm).

While the transmit power level of a Bluetooth device is not available without first authenticating to the device, it is possible to elucidate this information. A discoverable Bluetooth device reveals several device characteristics to an unauthenticated user, including:

Bluetooth Device Address: an 802-compliant MAC address for the device

Major device classification: major device type, one of Computer, Phone, LAN access device, Audio Video device, peripheral, imaging device, wearable device, toy, or uncategorized Minor device classification: reveals additional information about the nature of the device, for example a phone device will be further classified in the minor device classification as a cordless, cellular, smart phone, or other device Vendor information: the vendor producing the Bluetooth hardware, such as "Broadcom" or "Cambridge Silicon Radio"

Further configuration and operating characteristics of a Bluetooth device may be retrieved without authentication using various host controller interface (HCI) requests, including:

HCI_Read_Remote_Name, the friendly name of the Bluetooth target

HCI_Read_Remote_Version_Information, returns the Link Management Protocol version information of the Bluetooth target, corresponding to the Bluetooth SIG specification version HCI_Read_Remote_Supported_Features, returns a list of supported Link Management Protocol features of the Bluetooth target HCI_Read_Remote_Extended_Features, returns an extended list of supported Link Management Protocol features of the Bluetooth target In accordance with an aspect of the present invention, receiver subsystem 300 working in conjunction with distance estimating subsystem 400 collects one or more pieces of the information mentioned above, in conjunction with signal strength values for the target device. These values may be correlated using a database 440 of transmitter capabilities and characteristics to arrive at an estimate transmitter power. As examples:

A device with friendly name "BlackBerry 8100" may be identified as a BlackBerry Perl 8100, which uses a 2.5 mW transmitter.

A device with the Bluetooth Device Address prefix of 00:1B:63, LMP version 2.0, major class "Computer" and minor class "Laptop" may be identified as a MacBook or MacBook Pro computer from Apple Inc., which use 2.5 mW transmitters.

A device with the Bluetooth Device Address prefix of 00:1B:38, LMP version 2.1, major class "Computer" and minor class "Laptop" may be identified as a third-party Bluetooth interface from LTCOM, using a 100 mW transmitter.

Multiple lookups may be made to database 440 on different categories of information to estimate transmitter power. While exact matches may be found, and indeed information from multiple categories may be cross checked, it is possible to map the characteristics of the major and minor class information to a transmit power level for devices which do not have direct characteristic matches to previously recognized devices.

It should be noted that when a device is not recognized, its characteristics may be flagged for review, and/or transmitted such as via e-mail or FTP for further analysis and processing, which may include later updates to database 440.

As an example, most Bluetooth devices in the "Phone/Smartphone" class use a 2.5 mW transmitter, while devices with the major class "LAN Access Device" rely on persistent power sources and provide 100 mW transmitters.

Once an estimate of the transmit power for the target Bluetooth device has been made, it is possible to increase the accuracy of the distance algorithm, adjusting the reference signal strength reading to reflect that of the transmitter being measured.

As an example, in a distance estimation technique that is known to the art, it is possible to identify a common Bluetooth Class 2 device as having a reference RSSI of −40 dBm at 1 meter from the receiver subsystem. When the distance of an unknown Bluetooth device is not known, the RSSI characteristic of the device is used to estimate the distance. If the observed RSSI is −65 dBm, the distance can be calculated as 22 feet. Taking into consideration the observable characteristics of the device, it is possible to characterize the device as a Bluetooth Class 1 device, which would change the distance estimation to 76 feet.

Similar techniques to that of Bluetooth transmitter power identification and estimation may be applied to other wireless devices such as 802.11 wireless devices to estimate transmit power and by estimating transmit power, correct estimates of device distance. Retrieved device information may be used to look up characteristic power levels in a database. This information may include vendor and product identification, as well as other information such as observed 802.11 frame type and subtypes, observed duration identification values and inter-frame spacing for 802.11 AP discovery probes.

The implementation of IEEE 802.11k and 802.11v standards, incorporated herein by reference, provide additional opportunities to identify the transmit power of an 802.11 compliant wireless device through diagnostic reporting.

Access or surveillance nodes on a network supporting 802.11v may request diagnostic information including transmit power at the antenna in dBm with a +/−5 dB tolerance. Using this diagnostic response and later frames for signal strength measurement using RSSI or RCIP as examples, a node can use a reference signal strength to accurately reflect that of the client, increasing the accuracy of the distance estimation.

Target devices supporting the 802.11k mechanism may report current transmit power through the use of Link Measurement Request and Response frames. Similar to the request diagnostic reporting feature of 802.11v, a node may issue a link management request frame to a selected target (by STA for example) to identify the current transmit power level, using this value as an accurate reference signal strength value for improving accuracy of target distance estimation.

As an example, a node with one or more target STAs can issue Link Measurement Requests to the connected devices, inquiring for diagnostic information to disclose the current device transmit power. The target STA receiving the request will respond with a Link Measurement Response frame that discloses the device transmit power. The node receiving the Link Measurement Response frame will also receive RSSI information at the receiver subsystem. With this data, the distance estimation algorithm can be adjusted for an accurate reference RSSI that reflects the current transmit power of the target STA while using the RSSI to improve the accuracy of the location algorithm.

Another example may be applied when the device being measured is not connected to a wireless node, In this case, Link Measurement Requests cannot be issued to devices that are encrypting data with their node. To identify the current transmit power on the unidentified device, the receiver subsystem may apply a series of tests based on observed behavior, including but not limited to database lookups of device characteristics, to identify a reference RSSI that matches the observed device characteristics. With the collected RSSI information and the device characteristics observed from known devices with similar characteristics, an accurate reference RSSI can be used to improve the accuracy of the location algorithm.

While the invention has been described in terms of various embodiments, the invention should not be limited to only those embodiments described, but can be practiced with modification and alteration within the spirit and scope of the appended claims. The description is thus to be regarded as illustrative rather than limiting.

What is claimed is:

1. A non-transitory computer readable medium comprising instructions which, when executed by one or more hardware processors, causes performance of operations comprising:
   determining Bluetooth device characteristics, of a transmitting device comprising a transmitter, based on a Bluetooth signal received from the transmitter by a receiver, the Bluetooth device characteristics include at least one of a major device classification and a minor device classification;
   determining, based on the Bluetooth device characteristics, one or more of: (a) an identification of the transmitting device, (b) a type of the transmitting device being one of a plurality of predetermined device types, or (c) a model name of the transmitting device;
   determining a transmit power associated with the transmitter of the transmitting device based on one or more of: (a) the identification of the transmitting device, (b) the type of the transmitting device, or (c) the model name of the transmitting device;
   measuring signal strength of the Bluetooth signal received from the transmitter of the device;
   estimating a distance between the transmitter and the receiver based on the transmit power associated with the transmitter of the transmitting device and the signal strength of the signal.

2. The computer readable medium of claim 1 wherein a device comprising the receiver is a node on a wireless network.

3. The computer readable medium of claim 1 wherein the Bluetooth device characteristics include a vendor information to identify a vendor producing hardware forming the transmitter.

4. The method of claim 1, wherein the Bluetooth device characteristics are obtained without requesting transmission.

5. The computer readable medium of claim 1, wherein the Bluetooth device characteristics include a model name of the transmitting device.

6. The computer readable medium of claim 1, wherein the determining of the transmit power and the estimating of the distance between the transmitter and the receiver are performed by a receiving device that comprises the receiver.

7. The computer readable medium of claim 6, wherein the receiving device is an access point.

8. A first device comprising:
   one or more hardware processors;
   a receiver;
   the first device configured to perform operations comprising:
   determining Bluetooth device characteristics, of a transmitting device comprising a transmitter, based on a Bluetooth signal received from the transmitter by the receiver, the Bluetooth device characteristics include at least one of a major device classification and a minor device classification;
   determining, based on the Bluetooth device characteristics, one or more of: (a) an identification of the transmitting device, (b) a type of the transmitting device being one of a plurality of predetermined device types, or (c) a model name of the transmitting device;
   determining a transmit power associated with the transmitter of the transmitting device based on one or more of: (a) the identification of the transmitting device, (b) the type of the transmitting device, or (c) the model name of the transmitting device;
   measuring signal strength of the Bluetooth signal received from the transmitter of the transmitting device;
   estimating a distance between the transmitter and the receiver based on the transmit power associated with the transmitter of the device and the signal strength of the Bluetooth signal.

9. The first device of claim 8 wherein the transmit power is looked up in a database using one or more of: (a) the identification of the transmitting device, (b) the type of the transmitting device, or (c) the model name of the transmitting device.

10. The first device of claim 8 wherein the Bluetooth device characteristics include information observed in transmitted wireless frames.

11. The first device of claim 8 wherein the Bluetooth device characteristics further include a vendor identification.

12. The first device of claim 8, wherein the determining of the transmit power is further based on a Media Access Control (MAC) address of the transmitting device.

13. A method comprising:
   determining, by a receiving device comprising a hardware processor and a receiver, Bluetooth device characteristics of a transmitting device, comprising a transmitter, based on a Bluetooth signal received from the transmitter, the Bluetooth device characteristics include at least one of a major device classification and a minor device classification;
   determining, based on the Bluetooth device characteristics, one or more of: (a) an identification of the transmitting device, (b) a type of the transmitting device being one of a plurality of predetermined device types, or (c) a model name of the transmitting device;
   receiving, from a remote source having a storage device, a transmit power associated with the transmitter of the device based on one or more of: (a) the identification of the transmitting device, (b) the type of the transmitting device, or (c) the model name of the transmitting device;
   measuring signal strength of the Bluetooth signal received from the transmitter of the transmitting device; and
   estimating a distance between the transmitter and the receiver based on (i) the transmit power received from the storage device through the use of the Bluetooth device characteristics and (ii) the measured signal strength of the Bluetooth signal.

14. The method of claim 13 wherein the receiving device is a node on a wireless network.

15. The method of claim 13 wherein the Bluetooth device characteristics further comprise a vendor information to identify a vendor producing the transmitting device.

16. The method of claim 13 wherein the transmit power for the transmitter is stored in a database at the remote source.

17. The method of claim 15 wherein the major device classification indicates the type of the transmitting device and the minor device classification identifies a subtype of the transmitting device.

18. The method of claim 17 wherein the major device classification is a phone and the minor device classification is a model type and a model name of a smartphone.

19. The method of claim 17 wherein the major device classification is a computer and the minor device classification is a laptop.

* * * * *